United States Patent
Lisk, III

(10) Patent No.: US 6,857,678 B2
(45) Date of Patent: Feb. 22, 2005

(54) TAILGATE ADJUSTMENT APPARATUS

(76) Inventor: Stanton E. Lisk, III, 6289 Blue St., Glenfield, NY (US) 13343

( * ) Notice: Subject to any disclaimer, the term of this patent is extended or adjusted under 35 U.S.C. 154(b) by 0 days.

(21) Appl. No.: 10/354,264

(22) Filed: Jan. 29, 2003

(65) Prior Publication Data

US 2004/0145207 A1 Jul. 29, 2004

(51) Int. Cl.⁷ .............................................. B62D 33/037
(52) U.S. Cl. .................... 296/50; 296/57.1; 292/338; 292/DIG. 29
(58) Field of Search ........................... 296/50, 57.1, 58, 296/59, 60, 106, 146.8; 292/DIG. 29, 338, 262, 278, 263, 339

(56) References Cited

U.S. PATENT DOCUMENTS

| | | | |
|---|---|---|---|
| 61,329 A | | 1/1867 | Farrell |
| 1,125,982 A | | 1/1915 | Dupala |
| 1,270,695 A | | 6/1918 | Carlson |
| 2,561,081 A | | 7/1951 | Vars |
| 4,981,320 A | * | 1/1991 | Bowman ................. 296/57.1 |
| 4,993,908 A | * | 2/1991 | Park ........................... 296/59 |
| 5,234,249 A | | 8/1993 | Dorrell |
| 5,331,718 A | * | 7/1994 | Gilbert et al. ................. 16/82 |
| 5,449,212 A | | 9/1995 | Seifert |
| 5,645,310 A | * | 7/1997 | McLaughlin ............... 296/57.1 |
| 5,711,569 A | * | 1/1998 | Sovoda ..................... 296/57.1 |
| 5,934,727 A | | 8/1999 | Storc et al. |
| 6,082,801 A | * | 7/2000 | Owen et al. ............... 296/57.1 |
| 6,206,444 B1 | * | 3/2001 | Casey ......................... 296/50 |
| 6,267,429 B1 | * | 7/2001 | Kuzmich et al. ............. 296/50 |
| 6,279,979 B1 | | 8/2001 | Cauley |
| 6,347,573 B1 | * | 2/2002 | Henkel et al. ............. 92/13.51 |
| 6,402,215 B1 | | 6/2002 | Leitner et al. |
| 6,422,630 B1 | | 7/2002 | Heaviside |
| 6,450,559 B1 | | 9/2002 | Renke |
| 2001/0005085 A1 | | 6/2001 | Bauer |
| 2002/0121794 A1 | | 9/2002 | Vejnar |

\* cited by examiner

*Primary Examiner*—Lori L. Colleta
(74) *Attorney, Agent, or Firm*—George R. McGuire; Bond, Schoeneck & King, PLLC

(57) ABSTRACT

A device for selectively adjusting and maintaining the angular position of a truck's tailgate relative to the truck's bed. The device generally includes an elongated threaded rod, a clamp attached to one end of the rod and adapted for engagement with a pin on the truck's bed, and a clevis attached to the opposite end of the rod and adapted for engagement with the tailgate's latching mechanism. A roller interconnected to the clevis permits smooth, pivotal movement of the tailgate between its modified (partially) open position and its fully closed position, and also permits attachment to various truck models.

19 Claims, 4 Drawing Sheets

TAILGATE ADJUSTMENT APPARATUS

BACKGROUND OF THE INVENTION

The present invention relates generally to devices for permitting the adjustment of a pick-up truck's tailgate, and more particularly to such devices that permit the user to selectively maintain the tailgate in a partially open position.

Pick-up trucks include beds positioned behind the operator's cabin. The beds are useful for carrying cargo, such as lumber, tools, machinery, among many other things. To prevent the cargo from sliding off of the bed during transport, a tailgate is provided. The tailgate is a door hingedly connected to the bed along its bottom edge, and is movable between a fully open position in which it extends essentially co-planar (i.e., 180 degrees) with the floor of the bed, and a fully closed position which is virtually at a 90 degree angel relative to the floor. A latch mechanism provided on each of the opposing sides of the tailgate interface with corresponding pins provided on the sidewalls of the bed to maintain the tailgate in its fully closed positions, and a handle is provided to selectively disengage the latch mechanism and permit the tailgate to be opened.

It is often necessary to leave the tailgate open during transport if the cargo is above a certain size (e.g., lengths of lumber that are longer than the truck bed), or to have the cargo extend over the edge of the top of the tailgate when in its fully closed position. Either way, the cargo is more likely to fall from the truck bed than if it is fully contained in the bed and bound by the walls of the bed and tailgate. It is therefore desirable to provide a device that permits the tailgate to be securely maintained in a partially open position so as to effectively increase the useful length of the bed.

Several such devices have been conceived of and patented. Examples of truck bed extension devices can be readily seen in U.S. Pat. No. 61,329 to Farrell; U.S. Pat. No. 622,049 to Kissinger; U.S. Pat. No. 1,125,982 to Dufala; U.S. Pat. No. 1,270,695 to Carlson; U.S. Pat. No. 2,561,081 to Vars; U.S. Pat. No. 5,234,249 to Dorrell; U.S. Pat. No. 5,449,212 to Seifert; U.S. Pat. No. 5,645,310 to McLaughlin; U.S. Pat. No. 5,934,727 to Store; U.S. Pat. No. 6,279,979 to Cauley; U.S. Pat. No. 6,402,215 to Leitner; U.S. Pat. No. 6,422,630 to Heaviside; and U.S. Pat. No. 6,450,559 to Renke. Each of the devices taught in these patents permits a tailgate to be adjusted in a manner that effectively increases the useful length of the bed. However, these devices either lack adjustability, thereby only permitting the tailgate to be adjusted to one position, or the adjustability feature is complicated or less attractive due to the structural integrity of the device being compromised.

It is therefore a principal object and advantage of the present invention to provide a device that permits selective adjustment and maintenance of a tailgate to a partially open position between the conventional fully open and closed positions.

It is a further object and advantage of the present invention to provide a device that may be quickly installed on a truck.

It is another object and advantage of the present invention to provide a device that is cost effective to manufacture.

Other objects and advantages of the present invention will in part be obvious, and in part appear hereinafter.

SUMMARY OF THE INVENTION

In accordance with the foregoing objects and advantages, the present invention provides a device for selectively adjusting the position of a tailgate relative to a truck bed. The device generally comprises an elongated threaded rod having first and second opposite ends, a clamp removably attached to the rod's first end, a clevis removably attached to the rod's second end, and a roller interconnected to, and extending between the yokes of the clevis for rotation about its longitudinal axis. A clevis pin extends through aligned openings formed through the yokes, and serves as the axle about which the roller rotates. A retaining clip prevents the clevis pin from becoming disassociated from the clevis.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
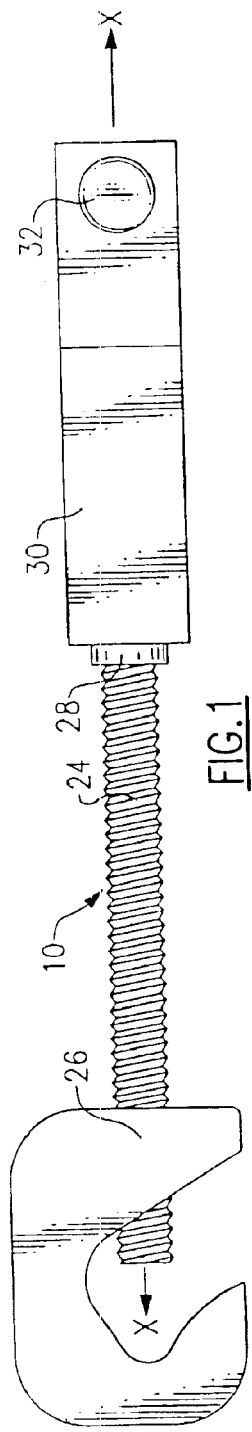
FIG. 1 is a side elevation view of the present invention.
Figure 2:
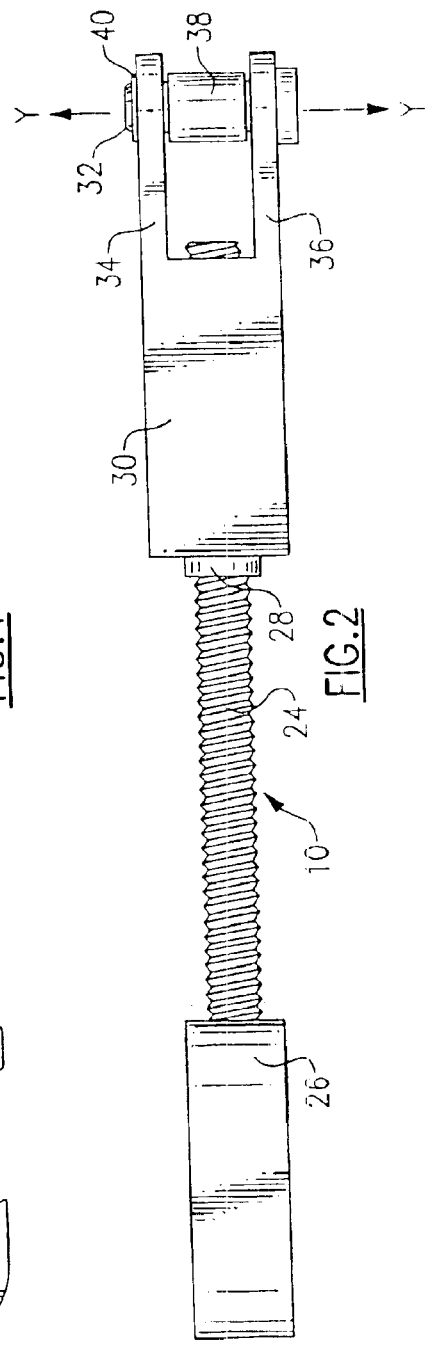
FIG. 2 is a top plan view thereof.
Figure 3:
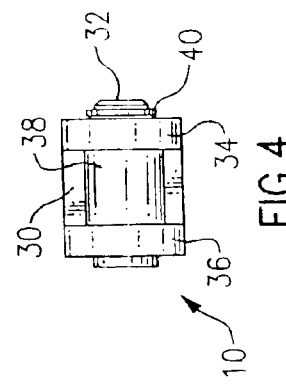
FIG. 3 is a front elevation view thereof.
Figure 4:
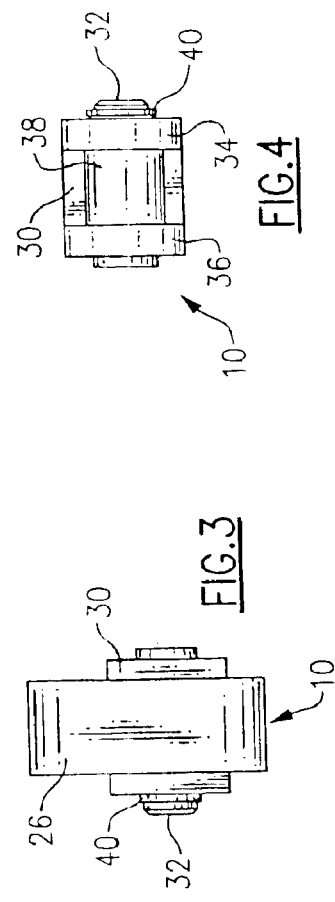
FIG. 4 is a rear elevation view thereof.
Figure 5:
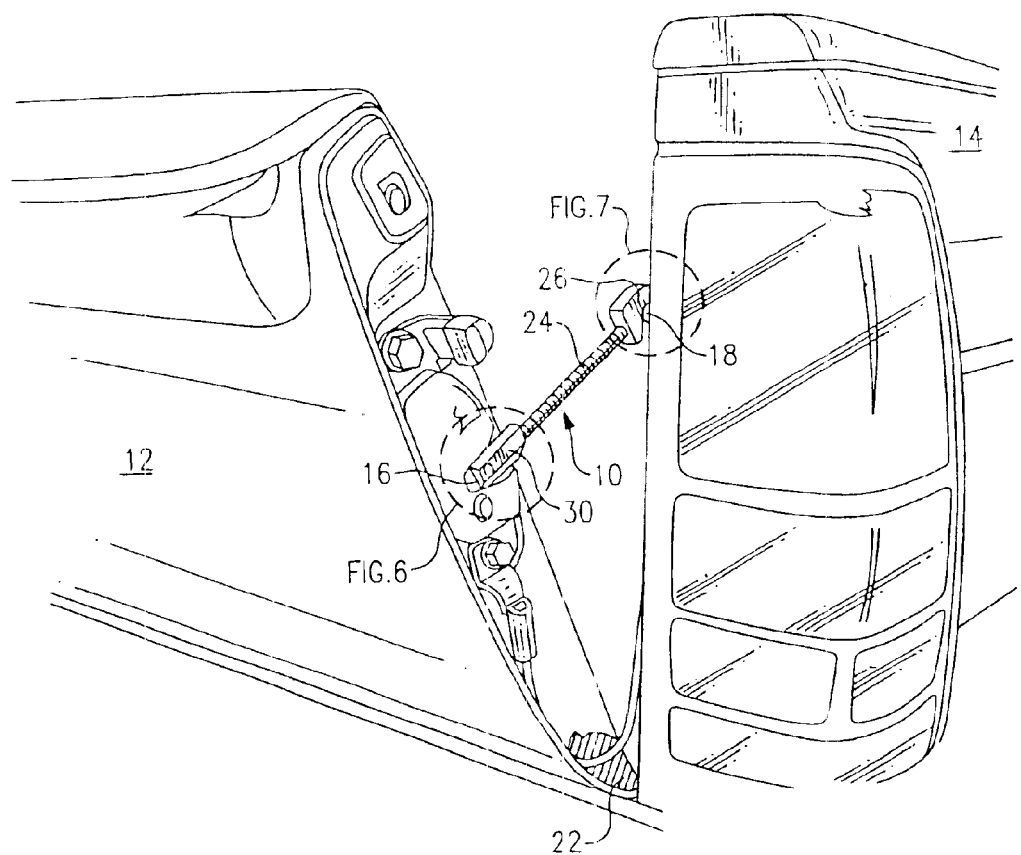
FIG. 5 is a perspective view illustrating use of the present invention on a partially shown pick-up truck bed and tailgate.
Figure 6:
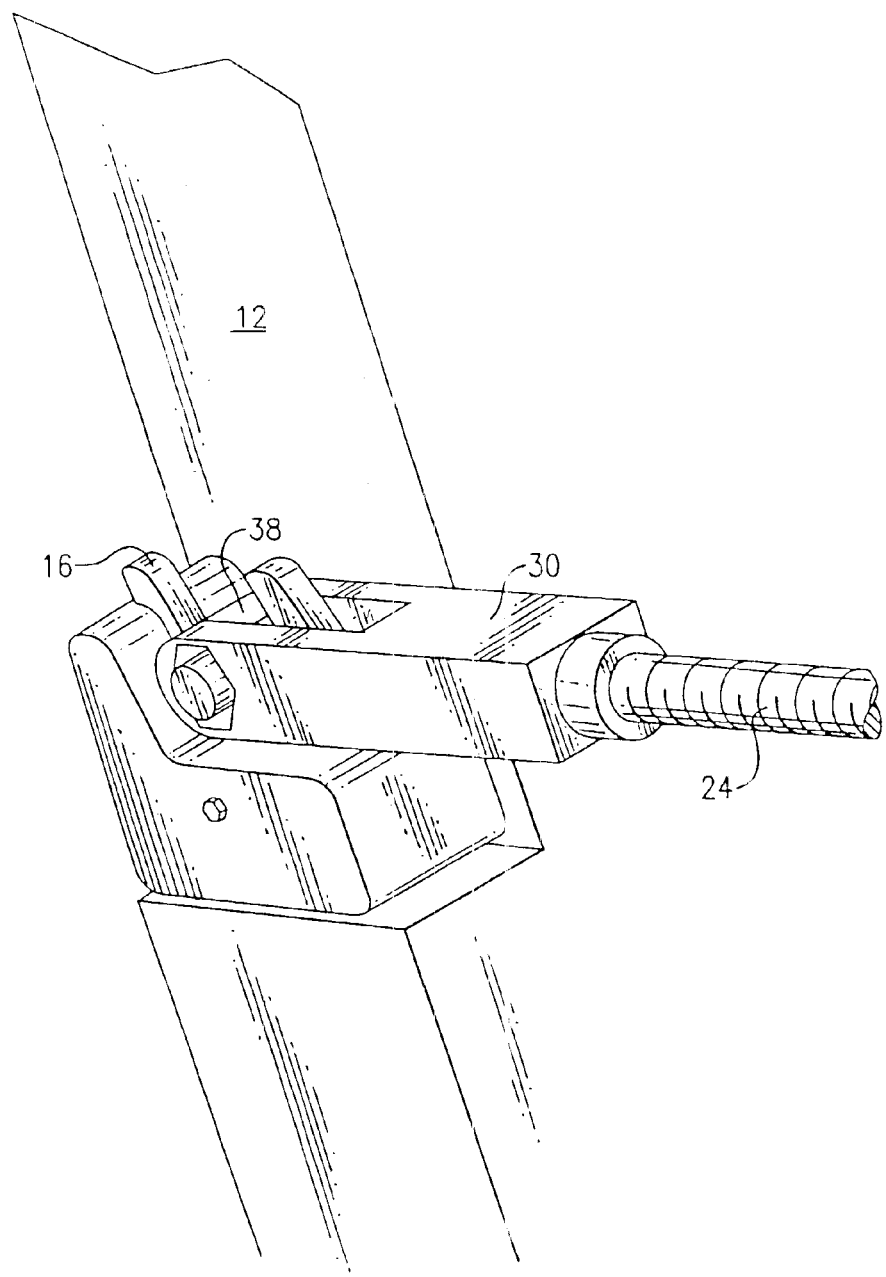
FIG. 6 is an enlarged perspective view of the portion encircled and labeled "See FIG. 6" in FIG. 5.
Figure 7:
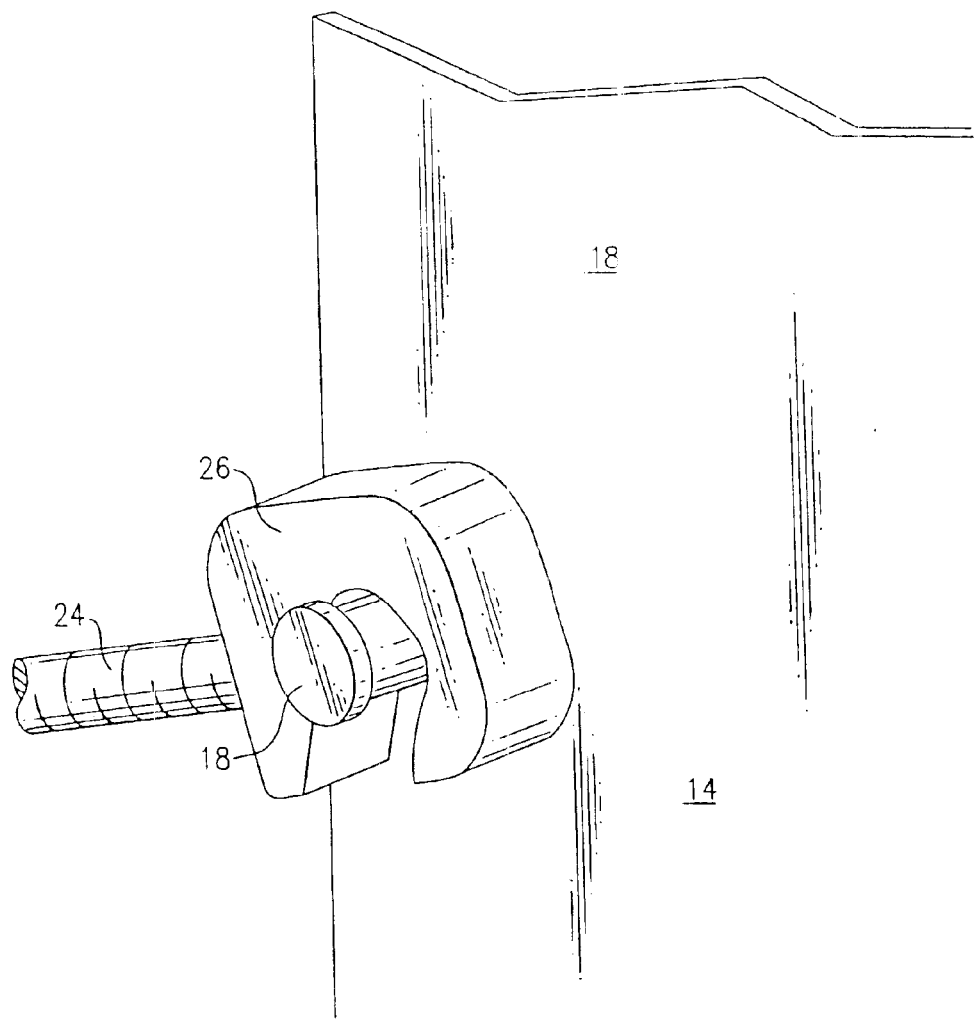
FIG. 7 is an enlarged perspective view of the portion encircled and labeled "See FIG. 7" in FIG. 5.

Referring now to the drawings, wherein like reference numerals throughout, there is seen in the Figures a device, designated generally by reference numeral 10, for selectively adjusting and maintaining the open position of a tailgate 12 (FIG. 5) anywhere between its conventional fully open or fully closed position, although it has limited adjustment due to clearance restrictions of the tail gate latching mechanism.

Tailgate 12 is generally pivotally connected along its bottom edge to a truck bed 14, and conventionally includes a spring biased latch 16 adapted to engage a locking pin 18 positioned on the sidewall 20 of bed 14 (the latch and pin mechanisms are generally included on each side of the tailgate and bed, respectively). A flexible cord 22 securely tethers tailgate 12 to bed 14 and prevents undue stress from being imparted to the hinged connectors interconnecting tailgate 12 to bed 14.

Device 10 may be used to interconnect tailgate 12 to bed 14, and permit the open position of tailgate 12 relative to bed 14 to be selectively changed and maintained from its conventional position (e.g., 180 degrees relative to the floor of the bed). For instance, device 10 may be used to adjust and maintain tailgate 12 in its fully open position that is at a 45 degree angle relative to the floor of bed 14 if it is so desired (device 10 is capable of maintaining tailgate at any angular position relative to the floor of bed 14 between 90 conventional (fully closed) and 180 conventional (fully open) degrees).

Device 10 generally comprises an elongated rigid threaded rod 24 extending along axis X—X, a clamp, such as a c-clamp 26, that is adjustably and removably threadably connected to one end of rod 24, a jam nut 28 that may be threaded on rod 24 and serve as a stop (or jam), and a clevis 30 that may be threaded on the end of rod 24 opposite clamp 26 and in abutting relation to jam nut 28. Device 10 further comprises a clevis pin 32 that extends along an axis Y—Y that is transverse to axis X—X, and through the axially aligned opening formed through the opposing yokes 34, 36 of clevis 30, a roller 38 positioned between yokes 34, 36 and through which pin 32 co-axially extends to permit rolling rotation of roller 38 about the longitudinal axis Y—Y, and a snap (retaining) ring 40 that snappingly engages the end of pin 32 on the outside of yoke 34, so as to prevent pin 32 from sliding out of engagement with clevis 30.

To assemble and operate device 10, first, one and of threaded rod 24 is threadably attached to clamp 26 (the threads should not extend into the clamp's jaws at this time, but should only be connected to the clamp), followed by jam nut 28 being threaded along a predetermined distance from the opposite end of rod 24, preferably about 1½ inches from the end. Clevis 30 should then be threaded onto the end of rod 24 until it is gently positioned against jam nut 28 (i.e., clevis 30 should still be able to be rotated and tightened against jam nut 28). A roller 38 having a diameter appropriate for the particular truck on which device 10 is being used should then be selected and positioned between yokes 34,36. Pin 32 may then be inserted through the opening formed through yokes 34,36 and through roller 38, and retaining ring 40 may then be snapped over the end of pin 32 to secure it in place.

Once device 10 is assembled, it may be installed on the truck. Tailgate 12 should be open and pin 18 located on bed 14. Clamp 26 may then be positioned in clamping relation to pin 18, and rod 24 should then be rotated until it securely engages pin 18 between its end and the jaw of clamp 26 (the connection should preferably be secure enough so that device 10 will maintain its position relative to pin 18 when external support is removed but loose enough to permit device 10 to pivot about pin 18 when moving the tailgate between its open and closed position). A second device 10 may then be installed in this same manner on the opposite side of bed 14.

Next, jam nut 28 may be loosened relative to clevis 30, and tailgate 12 raised until it is closely adjacent clevis 30. Clevis 30 may then be rotated so as to orient roller 28 transverse to latch 16. Tailgate 12 may then be moved towards clevis 30 until latch 16 engages and latches over roller 38 (both devices 10 should engage tailgate 12 at the same time). Clevis 30 may then be threadably adjusted along rod 24 until it maintains tailgate 12 in the desired angular orientation relative to bed 14. Once at the desired length along rod 24, jam nut 28 may be tightened to secure clevis 30 in position. Tailgate 12 may then be closed (rollers 38 permit tailgate 12 to be moved toward its closed position, but never opened beyond the position set in the previous step, and the connection between clamp 26 and pin 18 is loose enough to permit pivotal movement of device 10 around pin 18.) Hence, tailgate 12 may be moveably positioned between its closed position and the angular open position relative to bed 14 set by the position of clevis 30 along rod 24.

What is claimed is:

1. A device for selectively adjusting the position of a tailgate relative to a truck bed, said device comprising:
   a. an elongated threaded rod having first and second opposite ends;
   b. a clamp removably attached to said first end;
   c. a clevis removably attached to said second end; and
   d. a roller interconnected to said clevis for rotation about its longitudinal axis.

2. The device according to claim 1, further comprising a nut threadably engaged with said rod.

3. The device according to claim 2, wherein said clevis is adapted to be positioned in abutting relation to said nut.

4. The device according to claim 1, further comprising a clevis pin removably interconnected to said clevis.

5. The device according to claim 4, wherein said clevis pin extends coaxially through said roller.

6. The device according to claim 4, further comprising a retainer ring engaged with said clevis pin, whereby said retainer ring prevents said clevis pin from becoming disassociated from said clevis.

7. The device according to claim 4, wherein said clevis pin extends along an axis that is transverse to said elongated rod.

8. A device for selectively adjusting the position of a tailgate relative to a truck bed, said device comprising:
   a. an elongated threaded rod having first and second opposite ends;
   b. means attached to said first end for interconnecting said rod to the truck bed;
   c. means attached to said second end for interconnecting said rod to the tailgate; and
   d. means for selectively adjusting the adjusting position of the tailgate relative to the truck bed.

9. The device according to claim 8, wherein said means attached to said first end for interconnecting said rod to the truck bed comprises a clamp.

10. The device according to claim 9, wherein said claim is a c-clamp.

11. The device according to claim 8, wherein said means attached to said second end for interconnecting said rod to said tailgate comprises a clevis.

12. The device according to claim 11, further comprising a roller interconnected to said clevis.

13. The device according to claim 12, further comprising a clevis pin interconnected to said clevis and extending through said roller.

14. The device according to claim 13, further comprising a retaining ring engaged with said clevis pin, whereby said retaining ring prevents said clevis pin from becoming disassociated from said clevis.

15. The device according to claim 13, wherein said clevis pin extends along an axis that is transverse to said elongated rod.

16. The device according to claim 8, wherein said means for selectively adjusting the angular position of the tailgate relative to the truck bed comprises:
   a. a clevis attached to said second end of said rod; and
   b. a roller interconnected to said clevis for rotation about an axis that extends transverse to said rod.

17. A method for selectively adjusting the angular position of a tailgate relative to a truck bed, comprising the steps of:
   a. providing a device having an elongated rod with first and second opposite ends, a clamp connected to said first end, and a clevis connected to said second end;
   b. interconnecting said clamp to the truck bed;
   c. interconnecting said clevis to the tailgate; and
   d. selectively adjusting the position of said clevis along the length of said rod.

18. The method of claim 17, wherein the step of selectively adjusting the position of said clevis along the length of said rod comprises the further steps of:
   a. advancing a nut to a predetermined position along the length of said elongated rod; and
   b. advancing said clevis along the length of said elongated rod until it abuts said nut.

19. The method according, to claim 17, comprising the further step of moving the tailgate from its open position to its closed position, whereby said device pivotally moves about said clamp.

* * * * *

UNITED STATES PATENT AND TRADEMARK OFFICE
CERTIFICATE OF CORRECTION

PATENT NO.    : 6,857,678 B2
DATED         : February 22, 2005
INVENTOR(S)   : Lisk, Stanton E.

It is certified that error appears in the above-identified patent and that said Letters Patent is hereby corrected as shown below:

<u>Column 4,</u>
Line 19, omit "adjusting" (second occurrence) and substitute therefor -- angular --.
Line 23, omit "claim" (second occurrence) and substitute therefor -- clamp --.

Signed and Sealed this

Seventeenth Day of May, 2005

JON W. DUDAS
*Director of the United States Patent and Trademark Office*